(12) United States Patent
Ho et al.

(10) Patent No.: US 8,487,463 B2
(45) Date of Patent: Jul. 16, 2013

(54) ENHANCED MULTI-MODE POWER GENERATION SYSTEM

(76) Inventors: Andy Ho, Las Vegas, NV (US); Zheng Yan, Guangzhou (CN)

( * ) Notice: Subject to any disclaimer, the term of this patent is extended or adjusted under 35 U.S.C. 154(b) by 384 days.

(21) Appl. No.: 13/011,759

(22) Filed: Jan. 21, 2011

(65) Prior Publication Data

US 2011/0181049 A1 Jul. 28, 2011

Related U.S. Application Data

(60) Provisional application No. 61/297,639, filed on Jan. 22, 2010.

(51) Int. Cl.
*F03B 13/00* (2006.01)
*F03D 9/00* (2006.01)

(52) U.S. Cl.
USPC .............................. 290/44; 290/54

(58) Field of Classification Search
USPC ........ 290/44, 55, 54, 1 R; 60/641.12, 641.11, 60/641.15, 698, 659, 641.8; 320/101; 126/569, 126/604; 323/906
See application file for complete search history.

(56) References Cited

U.S. PATENT DOCUMENTS

| | | | | |
|---|---|---|---|---|
| 3,537,378 A | * | 11/1970 | Daly | 454/337 |
| 4,004,574 A | * | 1/1977 | Barr | 126/574 |
| 4,103,493 A | * | 8/1978 | Schoenfelder | 60/641.11 |
| 4,122,675 A | * | 10/1978 | Polyak | 327/28 |
| 4,182,960 A | * | 1/1980 | Reuyl | 290/1 R |
| 4,200,783 A | * | 4/1980 | Ehret | 392/341 |
| 4,306,416 A | * | 12/1981 | Iozzi | 60/641.11 |
| 4,651,805 A | * | 3/1987 | Bergeron, Jr. | 165/45 |
| 6,201,313 B1 | * | 3/2001 | Nakamats | 290/54 |
| 6,319,115 B1 | * | 11/2001 | Shingaki | 454/186 |
| 6,420,794 B1 | * | 7/2002 | Cao | 290/43 |
| 6,765,309 B2 | * | 7/2004 | Tallal et al. | 290/55 |
| 7,579,701 B1 | * | 8/2009 | White | 290/43 |
| 7,911,075 B2 | * | 3/2011 | Pagliasotti | 290/55 |
| 2007/0145160 A1 | * | 6/2007 | Martin | 236/49.3 |
| 2011/0021134 A1 | * | 1/2011 | Zwern | 454/343 |
| 2011/0095538 A1 | * | 4/2011 | Tabe | 290/55 |

* cited by examiner

*Primary Examiner* — Julio C. Gonzalez
(74) *Attorney, Agent, or Firm* — Kenehan & Lambertsen, Ltd.; John C. Lambertsen

(57) ABSTRACT

An enhanced multi-mode power generation system harnesses solar energy, wind, and heat within a designed building or within a large enclosed area, providing an indoor system to generate electricity. Air within an enclosure is heated, either by solar energy or by use of an electrified exothermic heating material, to enhance the airflow velocity within the enclosure. A system of narrowed passageways within the enclosure further increases the airflow velocity, which enhancement may also include or be supplemented by a blower. The enhanced velocity air is passed through one or multiple-staged wind turbines to generate electrical power.

5 Claims, 4 Drawing Sheets

ENHANCED MULTI-MODE POWER GENERATION SYSTEM

RELATED APPLICATIONS

The present application claims priority under 35 U.S.C. §119(e) to U.S. Provisional Patent Application Ser. No. 61/297,639, filed Jan. 22, 2010, which is incorporated by reference herein for all that it contains.

BACKGROUND OF THE INVENTION

1. Field of the Invention

The present invention relates to power generation, and more specifically to power generation utilizing wind turbines. More specifically, the present invention relates to an indoor wind turbine power generation system utilizing strong, steady-state winds of blower fans and optionally enhanced utilizing solar thermal energy.

2. Description of the Prior Art

Mankind is facing a crisis of energy shortage environmental pollution and coal and oil resources are limited. Environmentally-friendly and inexhaustible new energy, such as solar, wind and geothermal are actively developing around the world.

Current wind and solar power generating are dependent upon Mother Nature. A wind turbine cannot spin if there is no wind, and a solar cell cannot generate electricity if there is no sunlight. Outdoor wind wheel installations are vulnerable to natural disasters and storm damage. Low, stand-alone power generation having technical requirements and relatively high building costs define the shortcomings of widely used wind power generation technology today. Solar photovoltaic power generation not only requires a large number of silicon and battery carriers, with the associated high cost to construct, such cells cannot efficiently generate electricity. A need exists for new breakthroughs in clean, carbon-free power generation.

SUMMARY OF THE INVENTION

The present invention creates strong, steady-state wind, enabling a reduction in wind turbine blade size. The present invention provides a new technology designed to utilize solar energy, wind, air, and heat within a building and/or enclosed area. Heat energy within the enclosed area is utilized to enhance the creation of a large, steady stream volume of airflow that can be harnessed to drive wind turbine generators to generate electricity. By varying the layout of the physical structures containing such airflow, the present invention enables the generation of electricity in a wide variety of indoor environments.

The most advanced features of the present invention set this invention apart from the current wind and solar power generating. The indoor wind turbines of the present invention provide around-the-clock power generation through the use of blower fans, providing steady wind even in environmentally calm wind conditions outdoors and where sunlight is reduced or is entirely absent. The present invention opens a new field of power generation, one that utilizes clean, renewable energy in a far more efficient manner, benefitting all of mankind.

The present invention provides all-weather power generating, with the wind turbine set within a building and/or enclosed area. As so provided, the stand-alone power generation system of the present invention has a simple structure, a low cost to construct, is safe and practical to operate, and the variations in design and operational structures/features provides a new technology of power generation for mankind.

The present invention is designed to utilize solar energy, wind, air, and heat within a large building and/or large enclosed space, providing a breakthrough to the limitations of current wind and solar technology. According to the principles and methods of the present invention, such multi-mode power generation reflects the philosophy of Tai Chi by utilizing many possible sources of energy to achieve power generation (the result) with less effort.

The Tai Chi Multi-mode Polymer Power Generating System of the present invention utilizes different structures: (1) Airflow Collection Container; (2) Vertical Air Acceleration Pipe; (3) Ground Horizontal Round Circular Pipe; (4) Generator Units; and (5) Auxiliary Generator Sets. These five components are typically utilized for the large-scale power plant. Small and medium-sized power plants might rely upon only four of these structures: the Airflow Collection Container; the Vertical Air Acceleration Pipe; one or more Generator Units; and Auxiliary Generator Sets.

By utilizing the combination(s) of solar energy, wind, and heat within a building and/or large contained space, a geometric increase in the strength of the air currents is obtained. The circulating air is heated, pressurized, and then accelerated; the wind turbine is caused to rotate ever faster, resulting in electrical generation of increased power output.

It is a further object of the present invention that the proposed multiple-option combinations of power generation can be utilized as power resources, either individually or jointly, from the options of solar energy, wind, and the dissipated heat from the building and/or enclosed area as power resources to generate electricity. Depending upon the usage, the Airflow Collection Container can be composed of a variety of structural shapes, the Wind turbine can be placed inside ground horizontal Circular Pipes and/or within the Vertical Air Acceleration Pipe. Through use the principles of I Ching (Book of Changes), the present invention utilizes a series of methods to make full use of energy conversion and achieve the purpose of efficient use of energy recycling.

In accordance with various aspects of the present invention an Airflow Collection Container collects natural wind and air. This air is then heated by solar energy through the rooftop Transparent Insulating Glass. The heated air rises into a Vertical Air Acceleration Pipe, with cold air continuously replenishing the rising air through Airflow Collection Container. One or more blowers located at an Automated Directional Wind Collecting Inlet increase the wind speed and aggregate the small units of solar heat, the natural wind, and the released building heat, combining all into a large volume and a strong, steady stream of warmed flowing air.

Tai Chi Multi-mode Polymer Power Generating System has two forms of structure:

Large-scale power plant consists of five parts:
Airflow Collection Container, Air Acceleration Pipe, ground horizontal round Circular Pipe, Generators and Auxiliary Generators; and Small and medium-sized power plant consists of four parts:
Airflow Collection Container, Air Acceleration Pipe, Generators and Auxiliary Generators.

The described strong current aggregate container includes the main body of the Airflow Collection Container, the Automated Directional Natural Wind Collecting Inlet with built-in blower, and the Directional Air Inlet with built-in blower. The rooftop and siding are preferably Transparent Insulating Glass, and the ground is fabricated from an Electrified Exothermic Heating Material.

The described vertical acceleration pipe includes the Vertical Air Acceleration Pipe (shaped narrow top & wide bottom), the Vertical Air Return Pipe (shaped wide top & narrow bottom), the top exhaust fan, and the Air Return Port with built-in blower.

The described circular pipe includes the One-way Circular Pipe and the Directional Air Inlet includes a one-way guide plate and a Regulator Valve.

The described electric generator units include one or more wind turbines, a Transmission Shaft, and a Generator. For a large-scale power plant, the wind turbine(s) is placed inside of a ground horizontal round Circular Pipe. The wind turbine is placed inside of a Vertical Pipe for small and medium-sized power plants.

The described auxiliary generator consists of one or more sets of Wind Turbines, a Transmission Shaft, and an Electrical Generator. Wind turbines may be placed at the top and close to the bottom within the Vertical Pipe for a large-scale power plant. Wind turbines may be placed only at the top within the Vertical Pipe for Small and medium-sized power plant. An Auxiliary Generator is utilized to furnish the power consumed by the blowers and the Electrified Exothermic Heating Material.

A variety of structural shapes of Airflow Collection Container are possible, including round and rectangular for large-scale stand-alone power plant, rectangular for medium-sized, stand-alone power plant, and different-shaped small sealed containers attached to a building for small-sized power plant. In each case, the separate or combined use of solar, wind, air, and heat within a building and/or enclosed area serve as energy resources to achieve multi-mode combination of power generation. According to different environments and usage, small to large stand-alone power plants can be build to generate clean and renewable energy.

The use of Transparent Insulating Glass enables sun light to heat air within the Airflow Collection Container. An Electrified Exothermic Heating Material is also placed within the Airflow Collection Container. In light wind and no sunshine conditions the Electrified Heating Material automatically turns on to maintain the temperature within the Airflow Collection Container 10° C. higher than the external, environmental temperature. When combined with the wind supplied by the blower fan, enough airflow is created to drive the wind turbine and thus generate electricity. The heating material is equipped with power supply unit to energize the heating material when conditions require.

Tai Chi Polymer is imitating the philosophy of Tai Chi by combining solar energy, wind, and heat within a building or other enclosed space, heated by an Electrified Heating Material at the bottom of Airflow Collection Container, delivered to the Vertical Air Acceleration Pipe, the height difference between the top and bottom creates a temperature difference. Temperature differences of 10 C.° and above between the inside and the outside of an Airflow Collection Container accelerate the airflow. With a supply of cold air continuously flowing through the Airflow Collection Container, multiple sources are harnessed to accelerate the air, including blowers placed within the Automated Directional Nature Wind Collecting Inlet, Directional Air Inlet and the Vertical Air Acceleration Pipe.

By utilizing the multiple different forces resulting from differences in pressure and temperature, small units of natural wind and solar energy can be combined to create large volumes of continually flowing heated air. This moving airstream is believed to reach speeds of between 8 and 20 meter per second (18-45 mph). According to the mathematical relationship between wind speed and power, with power varying according to wind speed[3], the ratio of power generation and power pressure could be over 1 KW/M$^3$. This high-speed, powerful force of moving air drives the wind turbine(s), which in turn drives a transmission shaft that is connected to an electrical generator. In this manner a large amount of electricity can be generated.

Through utilization of the I Ching (Book of Changes), several sets of wind turbines can be placed inside of a round-shaped, horizontal Circular Pipe when the present invention is employed to create a large-scale power station. When the strong airflow drives the first wind turbine and generator, the strong airflow then flows toward the next set of wind turbines, and this airflow continues within the circular pipe, providing a one-way, high-speed circular flow to maximize the use and conversion of this wind energy.

In a further aspect of the present invention an enhanced multi-mode power generating system, comprising: an enclosure having a plurality of multiple adjacent chambers formed therein, wherein said multiple adjacent chambers are in fluid communication with one another; at least one wind turbine received within at least one of said multiple adjacent chambers; an electrical generator operatively connected to said at least one wind turbine in a manner to provide electricity upon rotation of said at least one wind turbine; a solar collector received within one of said multiple adjacent chambers; and an airflow collection chamber formed within one of said adjacent chambers, said airflow collection chamber having an air receiving chamber of a first volume in fluid communication with a first adjacent chamber and an air discharge chamber having a second volume in fluid communication with a second adjacent chamber, and wherein said first volume is greater than said second volume, wherein airflow from the chamber having said solar collector is received by said air receiving chamber of said airflow collection chamber and said at least one wind turbine receives airflow from said air discharge chamber of said airflow collection chamber, whereby upon initiation of airflow within said enclosure, said airflow is enhanced upon passage through said chamber having said solar collector and said airflow collection chamber prior to passage through said wind turbine.

It is to be understood that the invention is not limited in its application to the details of construction and the arrangement of components described hereinafter and illustrated in the drawing figures. Those skilled in the art will recognize that various modifications can be made without departing from the scope of the invention.

BRIEF DESCRIPTION OF THE DRAWINGS

Embodiments in accordance with the present invention are described below in connection with the accompanying drawing figures.

DETAILED DESCRIPTION OF THE PREFERRED EMBODIMENTS

Figure 1:
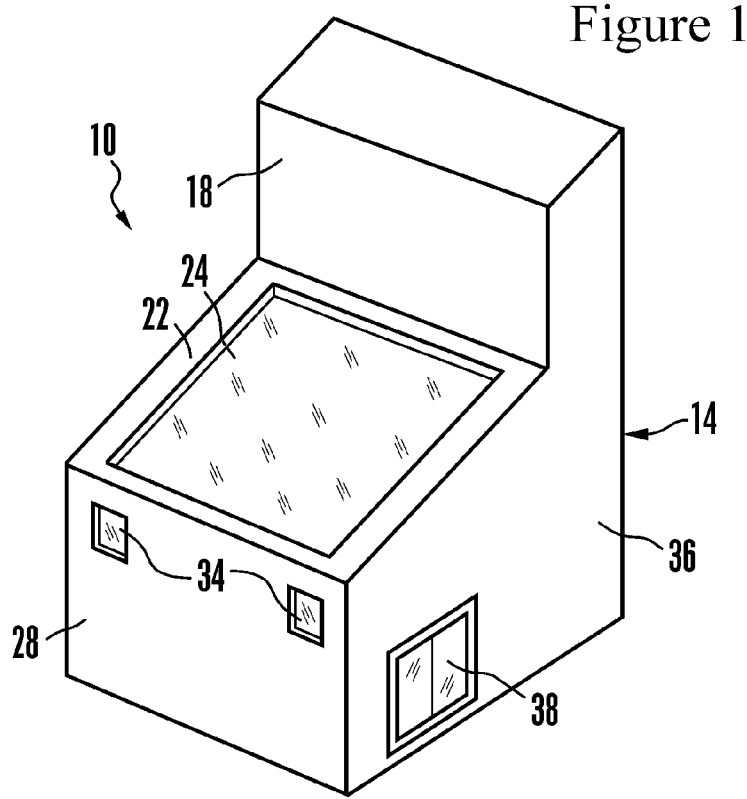
FIG. 1 is a perspective view of small- or medium-sized power plant in accordance with the present invention.

Reference is now made to the drawings wherein like structures refer to like parts throughout. In FIG. 1 a small- or medium size power plant 10 has an outer enclosure 14 with a vertically-extending air tower 18. A substantially planar, sloping roof 22 is provided a transparent panel 24 extending over a substantial portion of the planar roof 22. Utilization of the transparent panel 24 enables entry of solar energy into the outer enclosure 14. A front panel 28 includes a pair of vent windows 34, and a side panel 36 is provided an access panel 38.

Figure 2:
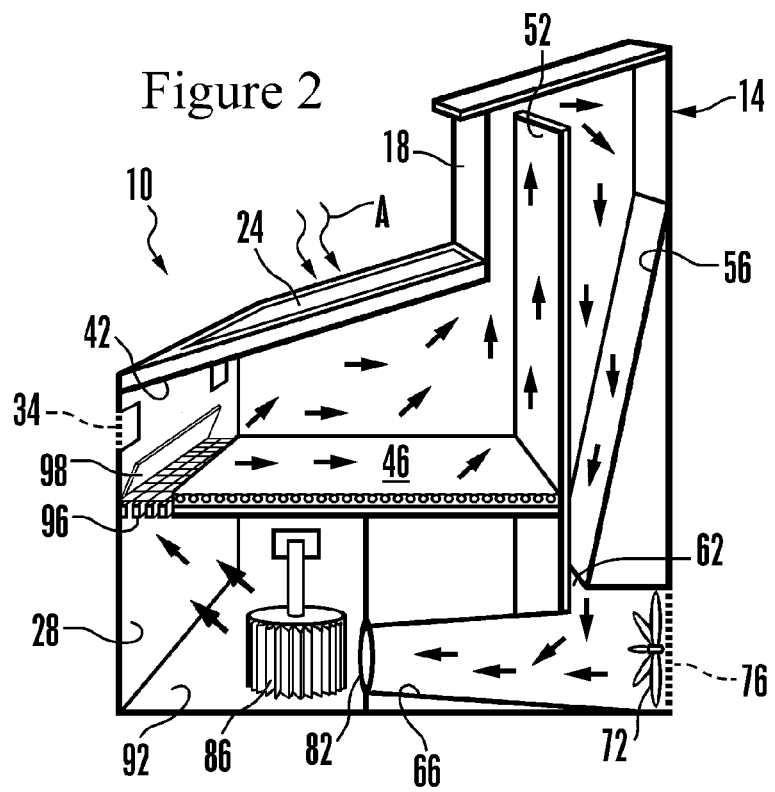
FIG. 2 is a side elevation of the small- or medium-sized power plant of FIG. 1 with a side panel removed to schematically show airflow and structures within the power plant in accordance with the present invention.

Utilization of the structures shown in FIG. 1 is best understood by making use of the schematic drawing of FIG. 2. Solar radiation, depicted by arrows A, is transmitted through the transparent panel 24 and into an airflow collection chamber 42. A thermal mat 46 receives the solar energy, is warmed thereby, and radiates the thermal energy into the surrounding environment within the collection chamber 42, warming the air—in this manner the collection chamber 42 acts as a solar collector. The warmed air rises into the air tower 18, being guided by a vertical panel 52.

This warmed airflow then descends within the air tower 18, and a convergence panel 56 located within the air tower 18 reduces the area available for passage of the descending air, causing it to accelerate. The air continues to accelerate under increasing restrictions in area, until flowing from the air tower 18 through an air tower discharge opening 62 and into a turbine charging chamber 66.

The area for air flow is further constricted within the charging chamber 66, providing further airflow acceleration. Where make-up airflow is required, such as when little solar energy is available—or when power generation enhancement is desired, a powered blower 72 is provided. An intake opening 76 provides access to outside air, and with the powered blower energized, outside air is drawn through the intake opening 76 and blown in to the charging chamber 66. Constrictions within the charging chamber 66 further accelerate the airflow until passage through the exhaust opening 82 and into the intake of a wind turbine generator 86 located in a turbine chamber 92. Air discharged from the wind turbine generator 86 flows through an air return opening 96 into the airflow collection chamber 42, with an air deflector 98 provided to optimally direct this discharged air. The wind turbine may include a generator or may be mechanically or otherwise operationally connected to an electrical generator located within or adjacent to the enclosure (not shown in the drawings) such that upon rotation of the generator electricity will be provided.

The small and medium-size power plants can be constructed out of any one of various materials suitable for providing an outer enclosure, such as wood, plastics, concrete, stone, brick—or combinations of one or more such materials. In a presently preferred embodiment, constructed to test the concepts of the present invention, the outer enclosure is constructed out of a wood frame and wood panel construction. The footprint is a rectangle measuring 8 feet by 16 feet, with the front panel 11 feet in height and the air tower rising to 18 feet in the rear of the structure.

Figure 3:
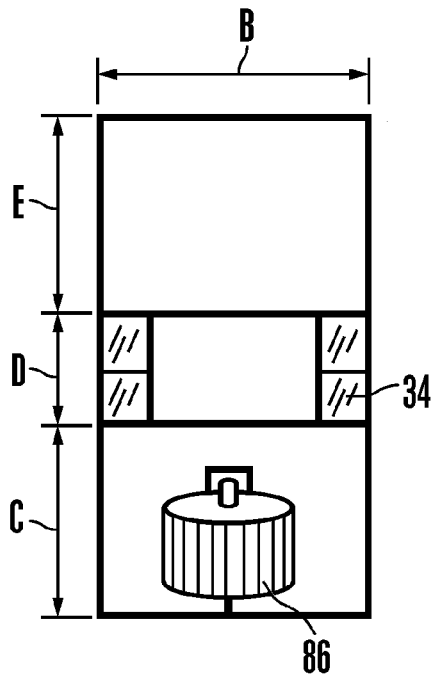
FIG. 3 is a front elevation schematic of the power plant of FIG. 1.

Turning now to FIG. 3, the structure width B is 8 feet and the height C of the front panel up to the vent windows 34 is 7 feet, the vent windows 34 lie in a panel D of 4 feet in height, with the height of both panels (C+D) equal to 11 feet. The vent windows 34 are preferably each single hung windows measuring 2 feet by 3 feet. The top of the air tower 18 extends a height E of 7 feet above the top of the front panel.

Figure 4:
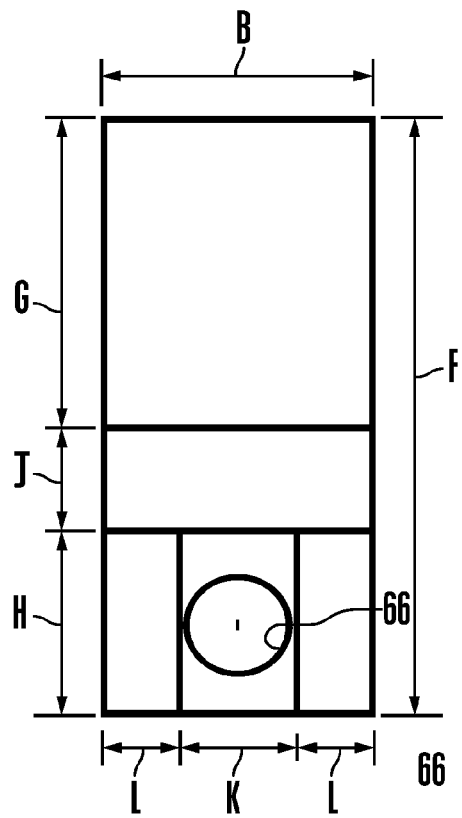
FIG. 4 is a rear elevation schematic of the power plant of FIG. 1.

In FIG. 4 the rear wall extends a distance F of 18 feet in height, with a distance G of 11 feet from the floor of the airflow collection chamber to the top of the air tower. A height H of the turbine charging chamber is 4 feet, with a distance J of 3 feet from the (projected) floor of the airflow collection chamber to the top of the turbine charging chamber. The width K of the turbine charging chamber at the back wall is 4 feet, with side panels of width L of 2 feet each.

Figure 5:
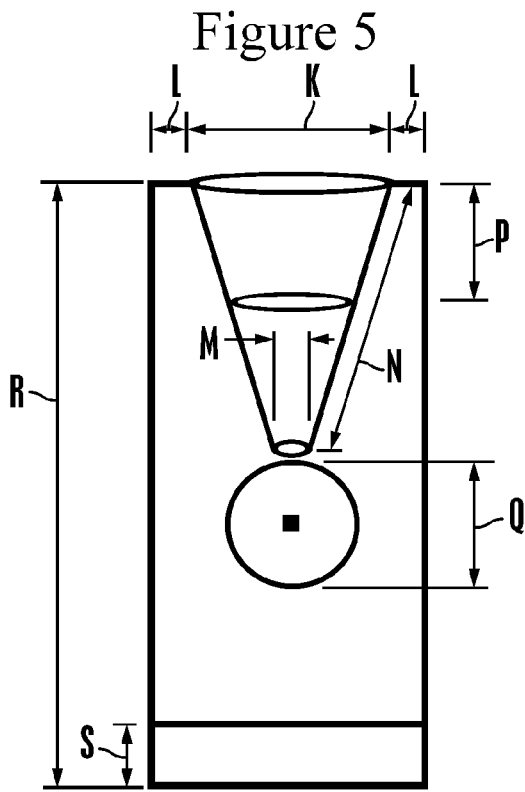
FIG. 5 is a top planar schematic of the lower, power generating section of the power plant of FIG. 1.

FIG. 5 shows the turbine charging chamber narrows to width M of 6 inches (width is adjustable) at the exhaust opening to the wind generator—a diagonal distance N of 8 feet from the back wall of the structure. A distance P of three feet from the back wall identifies where airflow from the air tower enters the turbine charging chamber, and at this location the turbine charging chamber measures approximately 3 feet in diameter. In one embodiment the diameter Q of the air turbine is 3 feet. The entire enclosure extends a distance R of 16 feet, with the width S of the air return opening of 1 foot.

Preliminary test data taken in January of 2011, using a Model No. 10255-36 inch-⅗ horsepower blower fan, manufactured by FlowPro of Taiwan that utilized 0.672 kWh to create a constant wind for use with a Model FTC 5 KVA wind turbine, manufactured by FTC Energy, Inc., of Palm Coast, Fla., provided the following data:

| Date | Time (PM) | Wind Speed (MPH) | Volt - no load |
| --- | --- | --- | --- |
| Jan 4 | 4:00 | 26.1 | 206 |
| | 4:30 | 25.9 | 198.3 |
| | 6:00 | 25.2 | 198 |
| | 7:40 | 25.9 | 182 |
| | 8:19 | 26.1 | 184.9 |
| | 8:25 | 29.5 | 175 |
| | 8:30 | 30 | 180 |
| Jan 5 | 12:43 | 34.2 | 233 |
| | 2:56 | 32.4 | 210 |
| | 6:15 | 32.2 | 216 |
| | 6:22 | 30.1 | 180 |
| Jan 8 | 1:50 | 34 | 230 |
| | 2:19 | 25 | 220 |
| | 2:58 | 24.1 | 189 |
| | 3:34 | 27.2 | 136 |
| | 4:07 | 30.1 | 180 |
| Jan 9 | 3:13 | 28.1 | 158 |
| | 3:34 | 27.7 | 153.9 |
| | 4:40 | 26.1 | 150 |
| | 6:45 | 29 | 191 |

The present invention is also useful in the design of larger power plants. In accordance with a presently preferred embodiment of the present invention in such a larger installation, a cylindrical or polygonal intake chamber is provided with atmospheric access openings to enable air to flow into the chamber, utilizing wind energy, when available, otherwise blowers are additionally provided. An upper surface of the intake chamber is transparent to sunlight, with a floor of the chamber consisting of a dark asphaltic compound that also includes an embedded grid of resistive heated wires. The dark floor absorbs sunlight energy, and heats the adjacent air, causing the air to rise into a vertical pipe, with replacement air entering through the atmospheric access openings, to be heated in turn.

Heated air flowing within the pipe flows through a progressively narrowing pipe, resulting in an increase in the velocity of flow. An air velocity-powered generator is located at the top of the vertical air acceleration pipe and is used to generate the electricity used for powering air blowers and to heat the intake chamber floor at times when there is no sunlight. A vertical air return pipe conducts the air from the velocity powered generator and down into a circular airflow pipe, channeling the air so all air flow is in one direction, around the circularly-arranged pipe. A number of air velocity-powered generators are spaced around the pipe, generating energy based upon the air flowing through the pipe. Exhaust valves are provided to enable the discharge of air from within the pipe.

A large-scale power generation installation is designed to continue the introduction of high-current and high-speed motion cycle to ground circular pipe enclosure. Wind-driven mechanical rotation provides power generation, at the same time when driving the first power generation wind turbine; strong airflow blows toward the next wind turbine, and so forth, achieving multi-unit, large-scale power generation.

Electrified Exothermic Heating Material absorbs the heat of sun, while in a weak wind or non-sunlight conditions; the Electrified Exothermic Heating Material continues to heat the air inside of the Airflow Collection Container, thereby maintaining airflow and power generation. Power provided by the installed External Generators and Auxiliary Generator can be utilized to power all of the blowers and Electrified Exothermic Heating Material, which more rapidly heats and blows the air to ensure the maintenance of strong airflow, even under a weak wind and solar environment.

When the wind speed is 3 m/s and above, 300-500 W/$M^2$ electricity can be generated. Typically a generator with 100 $M^2$ of wind blade area can generate approximately 2 KW of electricity; this is about the limit for present wind power generation. The present invention provides heated and accelerated air within the Airflow Collection Container, 5-50 m/s of airflow rate and wind pressure enables the generation of power of 1 KW/$M^3$ and above.

Abundant resources of wind and sunshine in many coastal regions, provides over 8,000 hours of annual generation time. Such good generating conditions permit the proportion of generating capacity and electricity supply of 1:0.91 to be achieved. In contrast, where there are weak winds or in areas with little sunshine, achieving annual power generation of 8,000 hours encounters a power generation and electricity supply quantity ratio of: 1:0.43.

Figure 6:
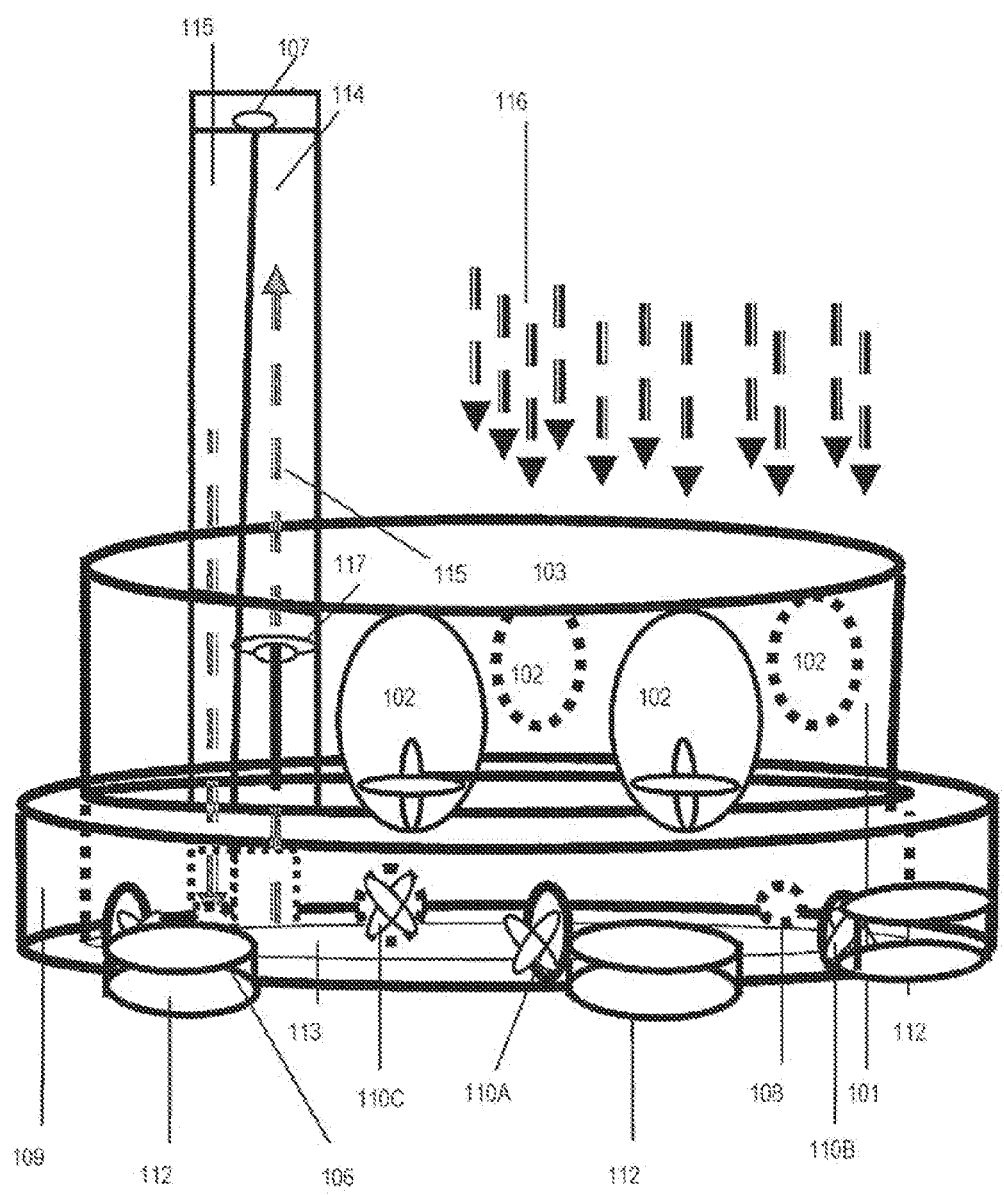
FIG. 6 is front view of a schematic representation of a large-scale horizontal round-shaped power station.
Figure 7:
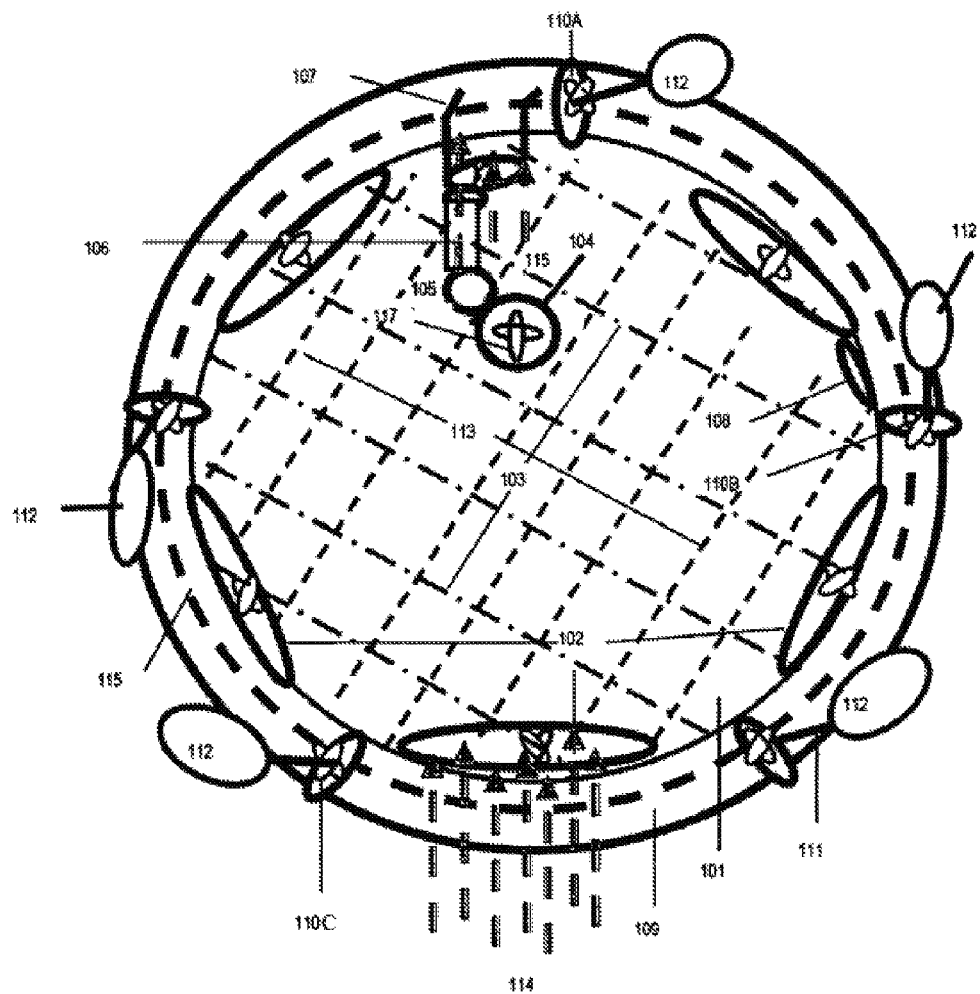
FIG. 7 is top view of a schematic representation of a large-scale horizontal round-shaped power station.

The stand-alone capacity of Tai Chi Multi-mode Combination Power Generating System can reach over 15 KW-100,000 KW by using the combination of multiple systems. Such a power generating system is shown in FIGS. 6 and 7. With strong environmental winds, the south-facing Automated Directional Nature Wind Collecting Inlet 102 of Airflow Collection Container 101 are opened when the environmental winds 114 are blowing from the south. Conversely, the north-facing Automated Directional Nature Wind Collecting Inlet 102 (shown in phantom) of Airflow Collection Container 101 when the environmental winds 114 from north. The same power generation method results, regardless of wind direction.

Blowers are used for the first acceleration of the environmental wind 114 collected through Automated Directional Nature Wind Collecting Inlet 102 into the Airflow Collection Container 101. At the same time, solar heat 116 is absorbed as a result of transmission through the Transparent Insulating Glass 103. This in turn results in an increase of the temperature of pressurized High-Speed Hot Air 115 located within the Airflow Collection Container 101, generally about 5-15 C.° higher than the outside, environmental temperature.

The absorption and re-radiation of the heat energy by the Electrified Exothermic Heating Material 113 causes the heated air to rise and accelerate within the Vertical Air Acceleration Pipe 104. By designing the vertical air acceleration pipe 104 with a wide bottom and a narrow top, an increase in air pressure and in wind speed is obtained. The large capacity intense heat flow of strong High-Speed Hot Air 115 and the Directional Air Inlet 107, having a built-in blower, provides a second stage of air acceleration.

The rising high-speed hot air 115 is blown by the blower of the Directional Air Inlet 107, which then travels through the vertical air return pipe 105 (narrow at the bottom, wider at the top to increase air pressure and wind speed) and is transported through a one-way guide plate and directed into the one-way Circular Pipe 109. In this manner high wind speeds of up to 8-50 m/s (and above) are achieved, providing 1 KW/$M^3$ generating power.

Rising strong High-Speed Hot Air 115 is reused by returning to the one-way Circular Pipe 109 via Vertical Air Return Pipe 105. In a presently preferred embodiment additional blowers are provided for Automated Directional Nature Wind Collecting Inlet 102, the built-in blower of the Directional Air Inlet 107, and Air Return Port 106 to further accelerate air flow.

The High-Speed Hot Air 115 flows into the one-way Circular Pipe 109 and drives a first wind turbine 110A. The resultant mechanical rotation is conveyed through a Transmission Shaft 111 to drive one or more External Generators 112 to generate electricity. The High-speed hot air likewise flows to a second wind turbine 110B and a third wind turbine 110C while the first wind turbine 110A is generating electricity, and this circular airflow continues within the one-way circular pipe 109. By replenishing the Strong High-Speed Hot Air 115 within the One-Way Circular Pipe 109 by air entering through Directional Inlet with blower 107 and the Air Return Port 106, a stable generation of electrical power can be maintained.

Regulator Valve 108 within the One-Way Circular Pipe 109 regulates the discharge of excess return air to the strong current Airflow Collection Container 101 for reuse. The Electrified Exothermic Heating Material 113 and the blowers are powered by the external Generators 112 driven by the wind turbines or, optionally, an Auxiliary Generator 117.

In such instances where there are weak to no wind and/or sunlight conditions, heat from the Electrified Exothermic Heating Material 113 can be used. Additionally, or exclusively, the Generators 112 and/or Auxiliary Generator 117 can be operated to run the air blowers. Use of the Electrified Exothermic Heating Material 113, maintains the temperature of strong High-Speed Hot Air 115 within the Airflow Collection Container 101 10° C. higher than external temperature. Such temperature differential provides air flow rates above 5 m/s that can be used to drive the wind turbine 110 to generate electricity. The operation of one or more the Generators 112 will be determined by weather conditions.

By way of example, and not limitation, the following illustrates the generation of electricity utilizing the present invention in such a large-scale power station as has been previously described. Utilizing a 100,000 $M^3$ strong current collector container and a vertical acceleration tube of over 100 M, a calculation can be made for power generation utilizing 1 KW/M/s×30% (energy conversion rate) and 9$M^2$ area of strong current inlet (with return port area). The strong current speed can reach 8-50 m/s, with an ideal generator capacity designed to be 20,000 KW, with the power station designed with 5 sets of generators to generate 100,000 KW (20,000 KW×5 sets=100,000 KW), annual power generation can be achieved in 8400 hours. An auxiliary generator is provided and designed at 10,000 KW.

The power generation mode of operation:

Design capacity of the host 5 sets equals 5×20,000 KW=100,000 KW, the annual power generation can be achieved 8400 hours. Wind power generation based on power calculation formula:

$$P = \tfrac{1}{2} p \pi r^2 v^3 C p$$

where Air density P is 1.2 KG/M3, 3.14 is used as the value of π (Pi), the wind radius r is set to 6M, the rated wind speed v is 50 M/s, the power conversion coefficient Cp is set at 2.3, then: P=½×1.2×3.14×6³×50²×2.3=19,499 KW, for a single generator rated at 20,000 KW.

The total generating capacity of generator: 20,000 KW×5 sets×8400 h=840,000,000 kWh/Year Total generating capacity−blower & heating material average power consumption (30%)=840,000,000-2,520,000=588,000,000 kWh/Year For a medium-size vertical power station: Construct a 20,000 M³ strong airflow collector container, vertical acceleration pipe over 100M, calculate actual power generating 1 KW/M/s×30% (energy conversion rate) and 5M² area of strong current air inlet (with return port area), Strong current speed can reach 8-50 m/s, generator capacity designed to be 20,000 KW.

For a small-scale power generator, construct an airflow collector container 50 M³ or larger, a generator capacity designed to be over 5 KW to meet the need of an average family.

Although the combination of drawings describe examples for implementation of the present invention, those of ordinary skill in this art will understand the variety of changes and modifications possible, yet all are considered to lie within the present invention as claimed.

Our invention has been disclosed in terms of a preferred embodiment thereof, which provides an enhanced, multi-mode power generation system that is of great novelty and utility. Various changes, modifications, and alterations in the teachings of the present invention may be contemplated by those skilled in the art without departing from the intended spirit and scope thereof. It is intended that the present invention encompass such changes and modifications.

We claim:

1. An enhanced multi-mode power generating system, comprising:

an enclosure having a plurality of multiple adjacent chambers formed therein, wherein said multiple adjacent chambers are in fluid communication with one another;

at least one wind turbine received within at least one of said multiple adjacent chambers;

an electrical generator operatively connected to said at least one wind turbine in a manner to provide electricity upon rotation of said at least one wind turbine;

a solar collector received within one of said multiple adjacent chambers;

an airflow collection chamber formed within one of said adjacent chambers, said airflow collection chamber having an air receiving chamber of a first volume in fluid communication with a first adjacent chamber and an air discharge chamber having a second volume in fluid communication with a second adjacent chamber, and wherein said first volume is greater than said second volume, wherein airflow from the chamber having said solar collector is received by said air receiving chamber of said airflow collection chamber and said at least one wind turbine receives airflow from said air discharge chamber of said airflow collection chamber; and an electrical blower in fluid communication with said air receiving chamber, wherein an intake opening is formed in an outer wall of said enclosure and wherein said electrical blower is in fluid communication with said intake opening, whereby upon initiation of airflow within said enclosure, said airflow is enhanced upon passage through said chamber having said solar collector and said airflow collection chamber prior to passage through said wind turbine and upon operation of said electrical blower air is made to flow from a location outside of said enclosure to said air receiving chamber.

2. An enhanced power generating system as described in claim 1, and further comprising a second airflow collection chamber formed in a separate one of said adjacent chambers, and wherein said electrical blower is in fluid communication with said air receiving chamber of said second airflow collection chamber.

3. An enhanced power generating system as described in claim 2, wherein said wind turbine receives airflow from said air discharge chamber of said second airflow collection chamber.

4. An enhanced power generating system as described in Claim 1, and further comprising an electrically heated surface formed in said one of said multiple adjacent chambers in which said solar collector is received.

5. An enhanced power generating system as described in claim 4, wherein an electrified exothermic heating material is provided in said one of said multiple adjacent chambers in which said solar collector is received.

* * * * *